United States Patent [19]

Sterzel et al.

[11] Patent Number: 4,616,041

[45] Date of Patent: Oct. 7, 1986

[54] MEMBRANES OF SUBSTANTIALLY NON-CROSSLINKED ORGANIC POLYMERS

[75] Inventors: Hans-Josef Sterzel, Dannstadt-Schauerheim; Axel Sanner, Frankenthal, both of Fed. Rep. of Germany

[73] Assignee: BASF Aktiengesellschaft, Ludwigshafen, Fed. Rep. of Germany

[21] Appl. No.: 705,635

[22] Filed: Feb. 26, 1985

[30] Foreign Application Priority Data

Mar. 2, 1984 [DE] Fed. Rep. of Germany ....... 3407720

[51] Int. Cl.$^4$ .............................................. C08F 8/30
[52] U.S. Cl. .................................... 521/27; 525/332.2; 525/333.3; 525/333.5; 525/333.6; 525/390; 525/471
[58] Field of Search ............ 521/27; 525/332.3, 333.3, 525/333.5, 333.6, 390, 471

[56] References Cited

U.S. PATENT DOCUMENTS 4,116,889  9/1978  Chlanda et al. ...................... 521/27

FOREIGN PATENT DOCUMENTS 2047564  12/1980  United Kingdom .

OTHER PUBLICATIONS

"Separation Science and Technology", Band 18, 4, 1983, S.307,339.

*Primary Examiner*—Joseph L. Schofer
*Assistant Examiner*—Bernard Lipman
*Attorney, Agent, or Firm*—Keil & Weinkauf

[57] ABSTRACT

A membrane of a substantially non-crosslinked organic polymer which contains complex-forming groups bonded to the polymer chain via an alkylene radical, at intervals of not less than 4 carbon atoms.

8 Claims, No Drawings

MEMBRANES OF SUBSTANTIALLY NON-CROSSLINKED ORGANIC POLYMERS

The invention relates to membranes of substantially non-crosslinked organic polymers which contain bonded complex-forming groups.

Membranes whose separation mechanism depends on the pore size and on cohesive interaction with the membrane polymer are as a rule not particularly selective. This disadvantage has been overcome by developing supported membranes, as described, for example, in German Laid-Open Application DOS No. 2,910,793. There, a carrier is dissolved in a thin liquid film which is held by capillary forces in the micropores of a supporting membrane. However, the spectrum of applications of such liquid carrier membranes is limited, since the carrier concentration is limited by the solubility and moreover the membrane liquid must have a very low vapor pressure and a very low viscosity. These limitations are the more acute since liquids with a low vapor pressure as a rule have a high viscosity. German Laid-Open Application DOS No. 2,737,131 has already disclosed membranes of cross-linked polymers which contain reactive groups bonded via side chains. Such membranes of crosslinked polymers have performance disadvantages; for example, the selectivity decreases with the degree of crosslinking and the membranes are moreover expensive to process.

It is an object of the present invention to provide membranes with which the disadvantages of liquid membranes can be overcome and which moreover have good permeability, selectivity and processability.

We have found that this object is achieved by membranes of substantially non-crosslinked polymers which contain complex-forming groups bonded to the polymer chain via an alkylene radical, at intervals of not less than 4 carbon atoms.

The novel membranes have the advantage that the shortcomings of liquid membranes are avoided. They have the further advantage of good processability, permeability and selectivity. Moreover they are resistant to leaching.

The polymers are advantageously composed of structural units which possess high stability to acids and bases.

For achieving high mechanical stability and heat stability, the polymers which in the unmodified form have a softening point of above 80° C. have proved particularly appropriate.

Examples of particularly suitable polymers for use as the matrix are polystyrene, aromatic polysulfones, aromatic polyether-sulfones, polyether-imides, polyphenylene ethers and aromatic polyether-ketones.

The polymers contain complex-forming groups bonded via an alkylene radical, at intervals of not less than 4 carbon atoms. The alkylene groups may be linear or branched and advantageously have a chain length of from 6 to 22 carbon atoms, especially from 6 to 14 carbon atoms. Advantageously, the complex-forming groups are in the terminal position of the alkylene chain, ie. they are advantageously at a distance of not less than 6 carbon atoms from the polymer chain. It has proved advantageous for the alkylene chains to be bonded to aromatic structural elements of the polymers. Advantageously, the difference in the solubility parameters of the structural elements of the polymers and the side chains is at least 1 Joule$^{\frac{1}{2}}$/cm$^{3/2}$.

Examples of suitable complex-forming groups are tert.amino groups which in addition to being bonded to the alkylene radical are substituted by $C_1$–$C_4$-alkyl and may also be present in a quaternary form. Further suitable groups are Co(salene) groups of the formula

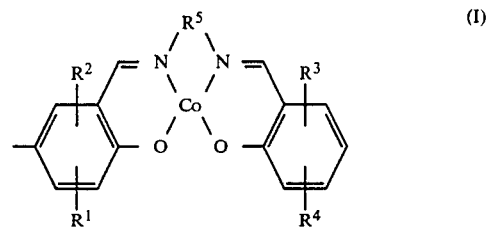

where $R^1$, $R^2$, $R^3$ and $R^4$ are each hydrogen, methyl, methoxy, fluorine or trifluoromethyl and $R^5$ is an ethylene or orthophenylene radical.

Particularly suitable complex-forming groups are derived from 8-hydroxyquinoline, 8-hydroxyquinaldine, β-hydroxyanthraquinones such as quinalizarin, amidoximes such as benzamidoxime, α-hydroxyoximes or salicylaldoxime.

The concentration of the complex-forming groups in the polymers is advantageously from 0.05 to 5 equivalents per kilogram, especially from 0.2 to 2 equivalents per kilogram. The side chains may be randomly or regularly distributed in the polymers.

Since it has been found that the selectivity is greatest for non-crosslinked polymers, there is a preference for completely non-crosslinked polymers and hence non-crosslinked membranes. These offer the further advantage that they are soluble in suitable solvents and that these solutions are very suitable for impregnating microporous carrier films or hollow fibers.

The novel membranes are advantageously applied onto microporous membranes which are known for use as microfiltration membranes, for example of polyethylene, polypropylene or polytetrafluoroethylene. This application is effected by impregnating a microfiltration membrane with a solution of the polymer according to the invention, possessing complex-forming groups, and evaporating the solvent. The supporting membranes may be used in a sheet-like form, in spiral modules, or in the form of hollow fibers in hollow fiber modules.

The polymers containing side chains can be prepared by copolymerization or cocondensation of monomers substituted with the side chains according to the invention. Advantageously, however, the novel polymers containing side chains are prepared by a polymer-analogous reaction. A universally applicable type of reaction is, for example, the introduction of a ω-haloalkane chain. For this it is necessary that the polymer should contain an aromatic radical which is sufficiently nucleophilic to be capable of undergoing a Friedel-Crafts acylation. The polymers mentioned as being preferred are very suitable for this purpose.

To carry out the reaction, the polymer is dissolved in a suitable solvent, for example 1,2-dichloroethane, nitromethane or 2-nitropropane, and a Friedel-Crafts acylation is performed with the desired amount of a ω-chlorocarboxylic acid chloride. The conventional reaction conditions, namely temperatures of from −10° to +50° C. and reaction times of from 2 to 40 hours, using conventional catalysts such as aluminum chloride, zinc chloride, tin(IV) chloride or boron trifluoride-etherate in molar amounts, are employed.

After the reaction, the catalyst/polymer complex is decomposed, the polymer is separated off and, in a secondary reaction step, the keto group is reduced to the methylene group with hydrazine in alkaline triglycol. Thereafter, the product is treated with thionyl chloride to ensure that any hydroxyl groups formed by hydrolysis are reconverted to chlorine atoms.

The reduction of the keto group to the methylene group can also be carried out in a gentle manner by catalytic hydrogenation in the presence of a platinum metal catalyst at a hydrogen pressure of up to 300 bar.

Whereas the polymer-analogous reaction, carried out on the dissolved polymer, usually results in a random distribution of the side chains, multiblock copolymers with a very regular structure can be obtained by carrying out the reaction on the undissolved swollen partially crystalline polymer. In that case, only the amorphous regions of the partially crystalline polymer are amenable to reaction. Especially if high mechanical strength and chemical resistance at high temperatures are demanded, block structures with a high crystalline content serve to meet such requirements.

The complex-forming groups are bonded to the side chains by reaction with the ω-halogen group. For example, reaction with diethyl iminodiacetate gives the iminodiacetic acid group as the complex-forming group, and this group has very good chelating capacity.

Reaction with potassium cyanide in dimethylsulfoxide gives the ω-cyano group. This can be converted to amidoximes by reaction with hydroxylamines. A number of further possible ways of introducing suitable complex-forming groups are described in Separation Science and Technology, 18, (1983), No. 4, 307–339. Chelate-forming complexes, such as hydroxyquinoline, are advantageously bonded to the side chain by Friedel-Crafts alkylation under mild conditions.

The membrane according to the invention are suitable for the enrichment of metal ions in hydrometallurgy or for lowering the metal ion content in industrial effluent. It can also be used to remove nitrate ions from drinking water if α-dinaphthodimethylamine is used as a complex-forming agent. If the Co(salene) group is used as the complex-forming agent, the membrane can be used, for example, for selective separation of oxygen from air.

The example which follows illustrates the invention.

EXAMPLE

Using the reaction route described, a 12-chlorododecane side group was introduced into a polyether-sulfone, composed of units of the formula

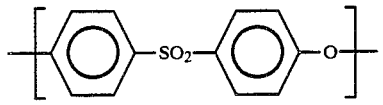

(relative viscosity of the starting material: 1.7, measured on a 1% strength solution in N-methylpyrrolidone at 25° C.) by reaction with 12-chlorododecanoyl chloride and subsequent reduction of the carbonyl group. The polymer thus obtained contained 0.36 equivalent of chlorine per kg. It was then dissolved in nitromethane and reacted with a two-fold molar excess of 8-hydroxyquinoline in 24 hours at 20° C., in the presence of aluminum chloride. The polymer was purified by precipitating the reaction product in methanol, and, three times in succession, redissolving it in nitromethane and reprecipitating it in methanol.

The content of 8-hydroxyquinoline groups was determined by titrating a solution of the polymer with a copper(II) sulfate solution in the presence of potassium iodide/starch. It was found to be 0.32 equivalent/kg.

A microporous carrier membrane of polypropylene was dipped in a 1% strength solution of the polymer in nitromethane. The excess solution was allowed to drain off and the membrane was then dried slowly. The conductivity of this membrane was measured as follows. The membrane was clamped in a measuring cell by means of a circumferential rubber gasket, the membrane dividing the cell into two chambers. The free membrane surface was 112 cm$^2$ and the volume of each chamber was about 140 cm$^3$. About 10 liters of a solution containing 100 ppm of Cu$^{2+}$ ions and having a pH of 2.5 were pumped through the inlet chamber. A solution containing 6% by weight of Cu$^{2+}$ and kept at a pH of from 0.5 to 1.0 by addition of sulfuric acid was pumped through the other chamber. At room temperature the permeability was $1.10^{-8}$ mol Cu$^{2+}$/cm$^2$.sec, with Cu$^{2+}$ ions permeating into the more concentrated solution.

COMPARISON EXAMPLE

In a comparative experiment, the microporous carrier membrane was impregnated with a 10% strength by weight solution, in kerosene, of 8-hydroxyquinoline bearing a linear dodecane side chain. Under comparable conditions, the permeability was only $2.10^{-9}$ mol Cu$^{2+}$/cm$^2$.sec.

We claim:

1. A membrane of a substantially non-crosslinked organic polymer having a softening point above 80° C. which contains complex-forming groups bonded to the polymer chain via an alkylene radical, said complex-forming groups being positioned on said alkylene radical at a distance of not less than 4 carbon atoms from the polymer chain.

2. A membrane as defined in claim 1, wherein the organic polymer contains bonded chelate-forming groups.

3. A membrane as defined in claim 1, which is composed of a polystyrene, an aromatic polysulfone, an aromatic polyether-sulfone, a polyphenylene ether or an aromatic polyether-ketone.

4. A membrane as defined in claim 1, wherein the complex-forming groups are present at intervals of not less than 6 carbon atoms.

5. A membrane as defined in claim 1, which contains from 0.05 to 5 equivalents of complex-forming groups per kg.

6. A membrane as defined in claim 1, applied to a microporous carrier membrane.

7. A membrane as defined in claim 1, wherein said complex-forming groups are positioned on said alkylene radicals at a distance of not less than 6 carbon atoms from the polymer chain.

8. A membrane as defined in claim 1, wherein the complex-forming groups are derived from 8-hydroxyquinoline, 8-hydroxyquinaldine, α-hydroxyanthraquinones, amidoximes, β-hydroxyoximes or salicylaldoxime.

* * * * *

UNITED STATES PATENT AND TRADEMARK OFFICE
CERTIFICATE OF CORRECTION

PATENT NO. : 4,616,041

DATED : October 7, 1986

INVENTOR(S) : Hans-Josef STERZEL

It is certified that error appears in the above-identified patent and that said Letters Patent is hereby corrected as shown below:

IN THE CLAIMS:

Claim 8, lines 3 and 4, col. 4, change "α-hydroxyanthraquinones" to -- β-hydroxyanthraquinones--; change "β-hydroxyoximes" to -- α-hydroxyoximes--.

Signed and Sealed this

Tenth Day of February, 1987

Attest:

DONALD J. QUIGG

Attesting Officer

Commissioner of Patents and Trademarks